(12) United States Patent
Chae et al.

(10) Patent No.: US 11,413,935 B2
(45) Date of Patent: Aug. 16, 2022

(54) COOLANT HEATER

(71) Applicants: Hanon Systems, Daejeon (KR); DAEWOO ELECTRONIC COMPONENTS CO., LTD., Jeollabuk-do (KR)

(72) Inventors: Yong Ha Chae, Daejeon (KR); Ji Hoon Park, Daejeon (KR); Jeong Hyun Son, Daejeon (KR); Man Ok Lee, Daejeon (KR); Bok Sun Kang, Daejeon (KR); Young Chul Kim, Daejeon (KR); Hak Kyu Kim, Daejeon (KR); Yong Jin Moon, Daejeon (KR); Seung Ho Lee, Daejeon (KR); Kil Sang Jang, Daejeon (KR); Hyun Seok Jung, Daejeon (KR); Kyung Seok Cho, Daejeon (KR)

(73) Assignees: Hanon Systems, Daejeon (KR); DAEWOO ELECTRONIC COMPONENTS CO., LTD., Jeollabuk-do (KR)

( * ) Notice: Subject to any disclaimer, the term of this patent is extended or adjusted under 35 U.S.C. 154(b) by 101 days.

(21) Appl. No.: 16/982,122

(22) PCT Filed: Mar. 22, 2019

(86) PCT No.: PCT/KR2019/003373
§ 371 (c)(1),
(2) Date: Sep. 18, 2020

(87) PCT Pub. No.: WO2019/182405
PCT Pub. Date: Sep. 26, 2019

(65) Prior Publication Data
US 2021/0070147 A1    Mar. 11, 2021

(30) Foreign Application Priority Data
Mar. 23, 2018 (KR) .................. 10-2018-0033680

(51) Int. Cl.
*B60H 1/00* (2006.01)
*B60H 1/22* (2006.01)
(Continued)

(52) U.S. Cl.
CPC ....... *B60H 1/2221* (2013.01); *B60H 1/00392* (2013.01); *F24H 9/20* (2013.01); *H01H 37/76* (2013.01)

(58) Field of Classification Search
CPC ..... B60H 1/2221; B60H 1/00392; F24H 9/20; H01H 37/76
(Continued)

(56) References Cited

U.S. PATENT DOCUMENTS 5,408,960 A * 4/1995 Woytowich ............ F02N 19/02
123/142.5 E
5,853,908 A * 12/1998 Okutoh ............ G01R 19/16542
429/7
(Continued)

FOREIGN PATENT DOCUMENTS

JP    H11306939 A    11/1999
JP    2008056044 A    3/2008
(Continued)

*Primary Examiner* — Davis D Hwu
(74) *Attorney, Agent, or Firm* — Norton Rose Fulbright US LLP; James R. Crawford

(57) ABSTRACT

The present invention relates to a coolant heater. The purpose of the present invention, a coolant heater which effectively heats coolant of a vehicle by means of a heating unit, is to provide a coolant heater having improved sensitivity and responsiveness to over-heating and assured stability by utilizing a temperature fuse to prevent over-heating. Another purpose of the present invention is to provide a coolant heater having enhanced durability of the temperature fuse coupling part by improving the structure by which the temperature fuse is fixed.

17 Claims, 11 Drawing Sheets

(51) Int. Cl.
*F24H 9/20* (2022.01)
*H01H 37/76* (2006.01)

(58) Field of Classification Search
USPC .......................................................... 165/202
See application file for complete search history.

(56) References Cited

U.S. PATENT DOCUMENTS

2008/0156285 A1* 7/2008 King ........................ F02N 19/02
                                                                                            123/142.5 E
2016/0264100 A1* 9/2016 Gong ........................ B60S 1/026

FOREIGN PATENT DOCUMENTS

| KR | 20120006026 U | 8/2012 |
| KR | 20140096482 A | 8/2014 |
| KR | 20150098879 A | 8/2015 |
| KR | 101655813 B1 | 9/2016 |
| KR | 20180005414 A | 1/2018 |

* cited by examiner (a)

(b)

… (1)

COOLANT HEATER

This application is a national phase under 35 U.S.C. § 371 of International Application No. PCT/KR2019/003373 filed Mar. 22, 2019, which claims the benefit of priority from Korean Application No. 10-2018-0033680 filed on Mar. 23, 2018. The entire contents of these applications are incorporated herein by reference in their entirety.

TECHNICAL FIELD

The present invention relates to a coolant heater, and more particularly, to a coolant heater capable of securing stability by preventing over-heating while effectively heating a coolant of a vehicle using a heating element.

BACKGROUND ART

A vehicle using an engine that uses gasoline, diesel, or the like as an energy source as a driving source is currently the most common type of vehicle, but with respect to such an energy source for a vehicle, there is an increasing need for new energy sources due to various causes such as environmental pollution as well as reduction of oil reserves, and as a result, electric vehicles, hybrid cars, and fuel cell vehicles are being currently put into practical use or under development.

However, unlike a conventional vehicle using the engine that uses oil as the energy source as the driving source, a heating system using a coolant may not be applied to the electric vehicle, the hybrid car, and the fuel cell vehicle or it is difficult to apply the heating system thereto. That is, the conventional vehicle using the engine that uses oil as the energy source as the driving source generates a large amount of heat in the engine, has a coolant circulation system for cooling the engine, and uses heat absorbed by the coolant from the engine for indoor heating. However, since a large amount of heat such as that generated in the engine is not generated in the driving source of the electric vehicle, the hybrid car, and the fuel cell vehicle, there has been a limitation in using such a conventional heating system.

Accordingly, several studies have been conducted on the electric vehicle, the hybrid car, the fuel cell vehicle, and the like, for example, a heat pump may be added to an air conditioning system to allow the heat pump to be used as a heat source, a separate heat source such as an electric heater is provided, or the like. Among them, the electric heater is now widely used because it may heat the coolant more easily without significantly affecting the air conditioning system. Here, the electric heater includes an air heating type heater for directly heating air blown into an interior of a vehicle, and a coolant heating type heater (or a coolant heater) for heating the coolant.

Japanese Patent Laid-Open Publication No. 2008-056044 ("Heating Medium Heater and Air Conditioner for Vehicle Using the Same", 2008. 03. 13, hereinafter, referred to as 'related art document 1') discloses one example of the coolant heating type heater. In the related art document 1, as illustrated in FIG. 1, there is disclosed a coolant heater having a structure in which heat medium distribution boxes 30 and 50 are in close contact with upper and lower portions of a positive temperature coefficient (PTC) electrode plate 41, which is a heat source, an upper side of the upper heat medium distribution box 30 and a lower side of the lower heat medium distribution box 50 are sealed by a substrate accommodation box 20 and a lid 51, respectively, to allow coolant to flow through flow paths 33 and 54, which are spaces formed between fins of a plate shape, thereby increasing a heat transfer efficiency between the PTC electrode plate and the coolant to heat the coolant more effectively. However, the coolant heater according to the related art document 1 has disadvantages that when the heater is stopped and operated, a temperature change of a heating element is severe due to a high temperature of the heating element, which may cause the heating element to be easily damaged, and an overheating prevention function of the heating element is incomplete and there is a risk of fire.

Korean Patent No. 1655813 ("Apparatus for Preventing Overheating", 2016. 09. 02, hereinafter, referred to as 'related art document 2') discloses a configuration for preventing overheating in a coolant heater. In the related art document 2, as illustrated in FIG. 2, the coolant heater includes a temperature-sensitive switch 30 that receives heat from a heater unit 20 and cuts off a power of the heater unit 20 when a temperature reaches a predetermined value or higher, and the temperature-sensitive switch 30 has one surface elastically supported by a fixing member 51 and is fixed to a heat transfer member 40. According to the related art document 2, there is an advantage that it is possible to prevent overheating by the temperature-sensitive switch, but there are several problems such as a limitation that a overheating detection responsiveness is not good, a structure in which the temperature-sensitive switch is mounted is complicated, and the stability is insufficient, resulting in high manufacturing or assembly costs and difficulty in guaranteeing performance. In addition, there is a problem that there is a possibility of leakage of coolant due to a large number of assembly/joints.

RELATED ART DOCUMENT

Patent Document

1. Japanese Patent Laid-Open Publication No. 2008-056044 ("Heating Medium Heater and Air Conditioner for Vehicle Using the Same", 2008. 03. 13)
2. Korean Patent No. 1655813 ("Apparatus for Preventing Overheating", 2016. 09. 02)

DISCLOSURE

Technical Problem

An object of the present invention is to provide a coolant heater that heats coolant of a vehicle using a heating element, the coolant heater improving an overheating detection responsiveness and securing stability by preventing overheating using a temperature fuse. Another object of the present invention is to provide a coolant heater that improves a temperature fuse fixing structure to improve durability in a temperature fuse coupling portion.

Technical Solution

In one general aspect, a coolant heater 1000 includes: a heating element 300 for heating coolant; a controller 400 for controlling the heating element 300; a temperature fuse 500 having a pair of terminal parts 510 electrically connected to the controller 400 by a cable 550 and blocking current supply of the heating element 300 according to a temperature of the coolant; and a fuse cover 600 formed in a form surrounding the temperature fuse 500 and mounted with the cable 550. The coolant heater 1000 may further include: a first housing 100 formed in a shape of a concave container with an opened upper side, and having an inlet portion 110 through which the coolant is introduced and an outlet portion 120 through which the coolant is discharged; a cover plate 200 coupled to cover the opened upper side of the first housing 100; and a second housing 700 formed in a shape of a concave container with an opened lower side and coupled to an upper end portion of the first housing 100, wherein the heating element 300 may be provided in an inner space formed by a coupling of the first housing 100 and the cover plate 200, the controller 400 may be disposed in the first housing 100, the temperature fuse 500 may be disposed on an upper side of the cover plate 200 and has a lower surface in contact with the cover plate 200, and the temperature fuse 600 may be coupled to the upper side of the cover plate 200.

The fuse cover 600 may include a pair of plate surface portions 610 formed in a plate shape vertically disposed on the cover plate 200 and spaced apart from each other and disposed in parallel, and a pair of partition wall portions 620 extending in a separation direction of the plate surface portions 610 to connect the plate surface portions 610, and the temperature fuse 500 may be disposed to be inserted into a space formed by the plate surface portions 610 and the partition wall portions 620.

Protrusions 611 may be formed on the plate surface portions 610, a pair of catching portions 221 formed in a plate shape parallel to the plate surface portions 610 on the upper side of the cover plate 200 and having a through hole may be formed to protrude, and the coupling between the fuse cover 600 and the cover plate 200 may be performed in a hooking method in which the protrusions 611 are fitted to the catching portions 221.

A seating groove 612 may be formed in one side of the plate surface portions 610 of the fuse cover 600, and the cable 550 may be inserted and seated into the seating groove 612.

A support portion 710 may be formed to protrude downward from a lower surface of a position corresponding to the fuse cover 600 of the second housing 700, and an upper surface of the fuse cover 600 may be supported by being in contact with the support portion 710.

The support portion 710 may be provided with a guide portion 720 extending from a lower end to a lower side, and a portion of the upper side of the fuse cover 600 may be inserted into the inside surrounded by the guide portion 720.

A seating portion 211 may be formed to be concave from the upper surface of the cover plate 200 to the lower side thereof, and a portion of a lower side of the temperature fuse 500 is inserted into the seating portion 211.

The cover plate 200 may include a main plate 210 formed in a shape corresponding to the opened upper surface of the first housing 100 and a sub-plate 220 coupled to be in surface contact with an upper surface of the main plate 210 and coupled with the fuse cover 600.

The sub-plate 220 may be disposed on a region corresponding to the position where the heating element 300 is disposed.

The cover plate 200 may be formed so that the main plate 210 and the sub-plate 220 are brazed.

The sub-plate 220 may include an extension bar 222 extending to protrude in a length direction of the coolant heater 1000.

The coolant heater 1000 further include a thermal pad 520 interposed between the temperature fuse 500 and the cover plate 200.

The coolant heater 1000 may further include a gasket 250 disposed for sealing at one end of the cover plate 200 in contact with the first housing 100 and the second housing 700.

The controller 400 may be disposed to be spaced apart from the upper side of the cover plate 200 and a through hole 410 that vertically penetrates through the controller 400 may be formed in a central portion of the controller 400, and the temperature fuse 500 may be disposed in a region where the through hole 410 is formed.

Advantageous Effects

According to the present invention, in the coolant heater capable of effectively heating the coolant of the vehicle using the heating element, the overheating detection responsiveness may be improved and the stability may be secured by preventing the overheating using the temperature fuse.

In addition, according to the present invention, the temperature fuse fixing structure is formed to be able to stably fix the temperature fuse while having a simple structure, and thus has a great effect of improving durability in the temperature fuse coupling portion. More specifically, since the temperature fuse fixing structure has a simple structure integrally formed on the cover plate, the increase in weight and parts is minimized, and the plate rigidity is also reinforced. In addition, since the temperature fuse may be stably fixed in an ideal regular position, there is also an effect that the operability of the temperature fuse itself and the durability against external impact are significantly improved compared to the related art.

[Description of reference numerals]

Figure 1:
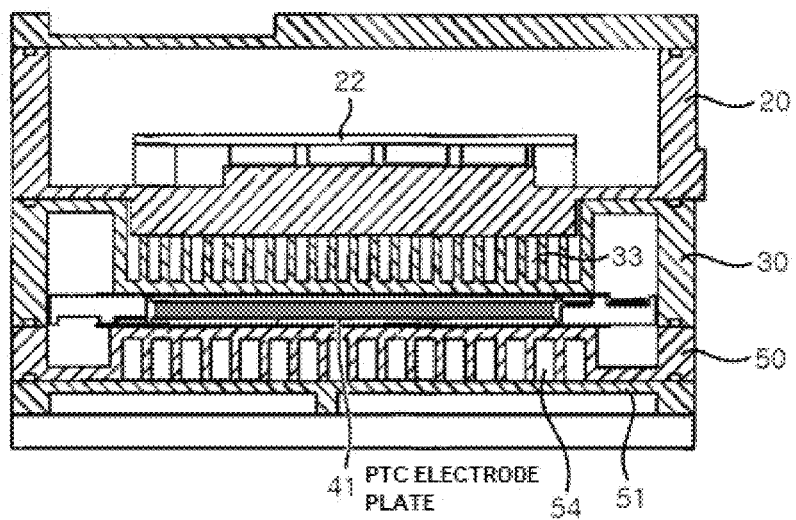
FIGS. 1 and 2 are several examples of a conventional coolant heater.
Figure 2:
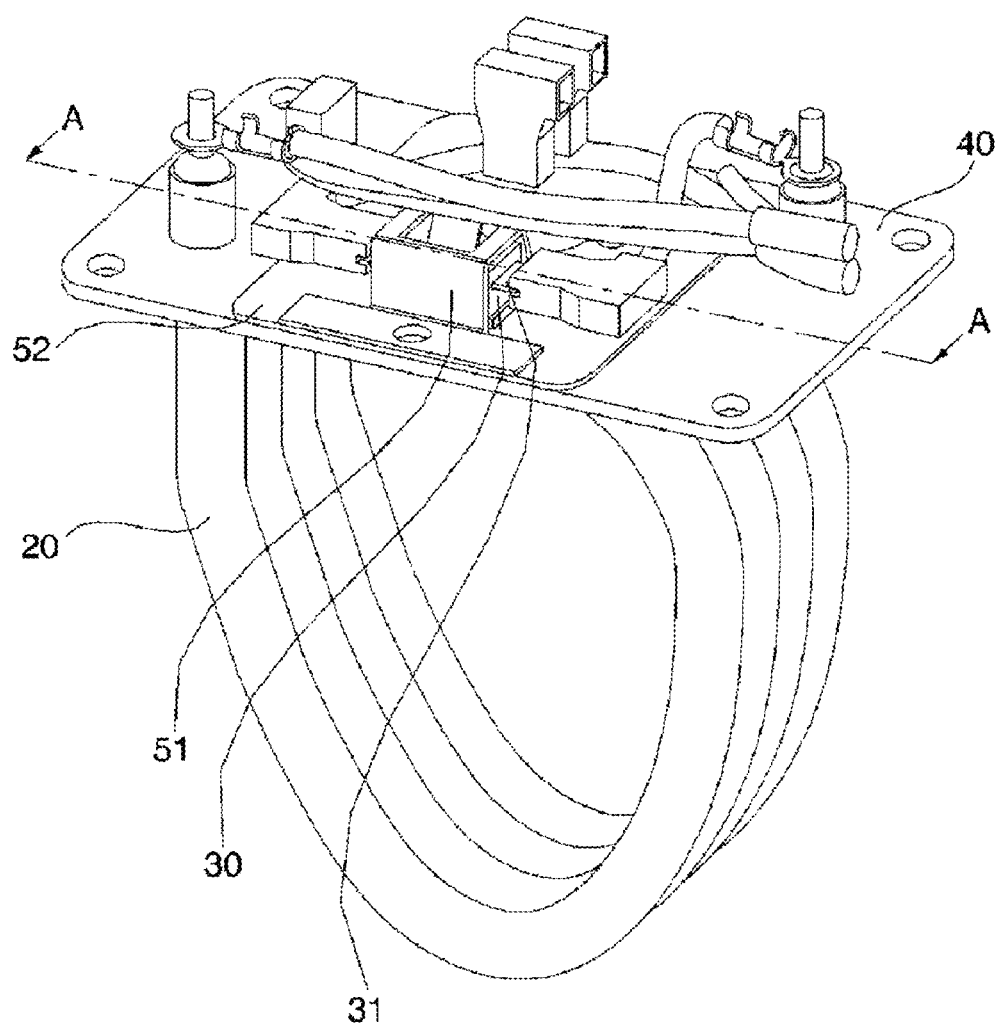

1000: coolant heater
100: first housing
110: inlet portion

-continued

[Description of reference numerals]

| | |
|---|---|
| 120: | outlet portion |
| 200: | cover plate |
| 210: | main plate |
| 211: | seating portion |
| 220: | sub-plate |
| 221: | catching portion |
| 222: | extension bar |
| 223: | seating hole |
| 250: | gasket |
| 300: | heating element |
| 400: | controller |
| 410: | through hole |
| 500: | temperature fuse |
| 510: | terminal portion |
| 520: | thermal pad |
| 550: | cable |
| 600: | fuse cover |
| 610: | plate surface portion |
| 611: | protrusion |
| 612: | seating groove |
| 620: | partition wall portion |
| 700: | second housing |
| 710: | support portion |
| 720: | guide portion |

BEST MODE

Hereinafter, a coolant heater according to the present invention having a configuration as described above will be described in detail with reference to the accompanying drawings.

[Basic Configuration of Coolant Heater of the Present Invention]

Figure 3:
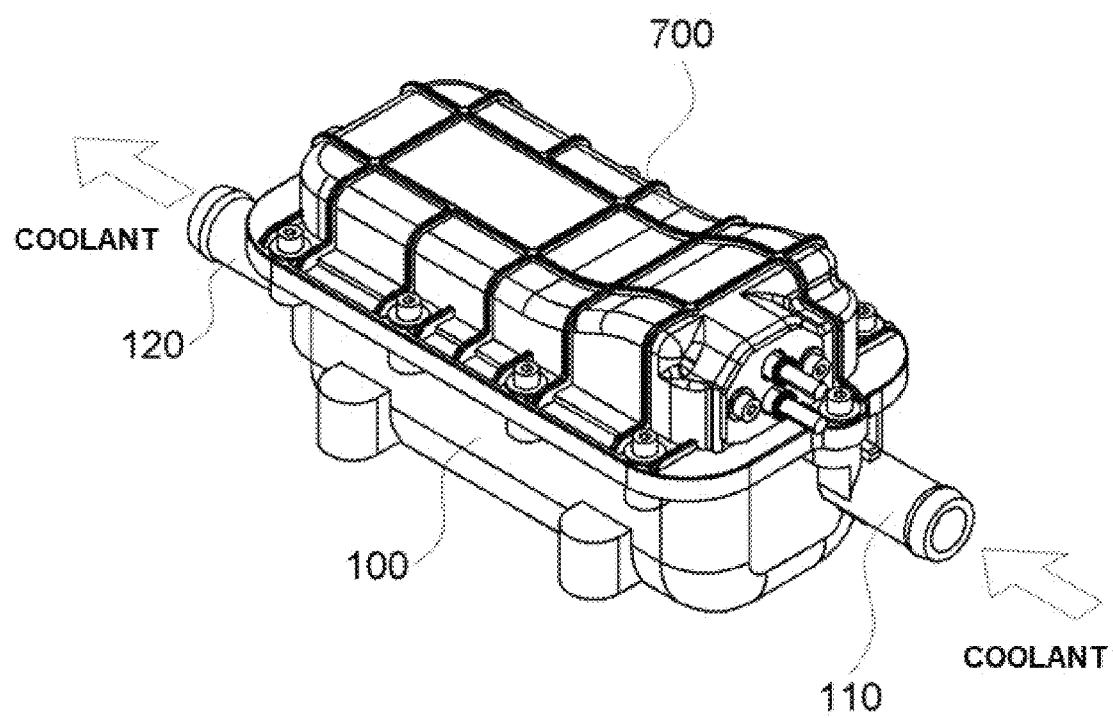
FIG. 3 is an assembled perspective view of a coolant heater according to an embodiment of the present invention.
Figure 4:
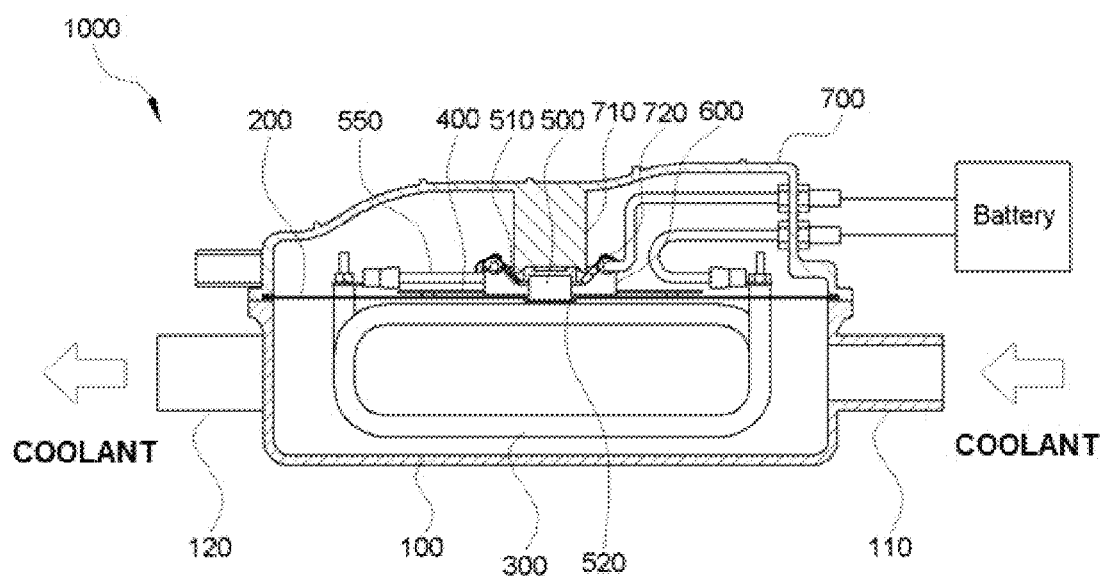
FIG. 4 is a cross-sectional view of the coolant heater according to an embodiment of the present invention.
Figure 5:
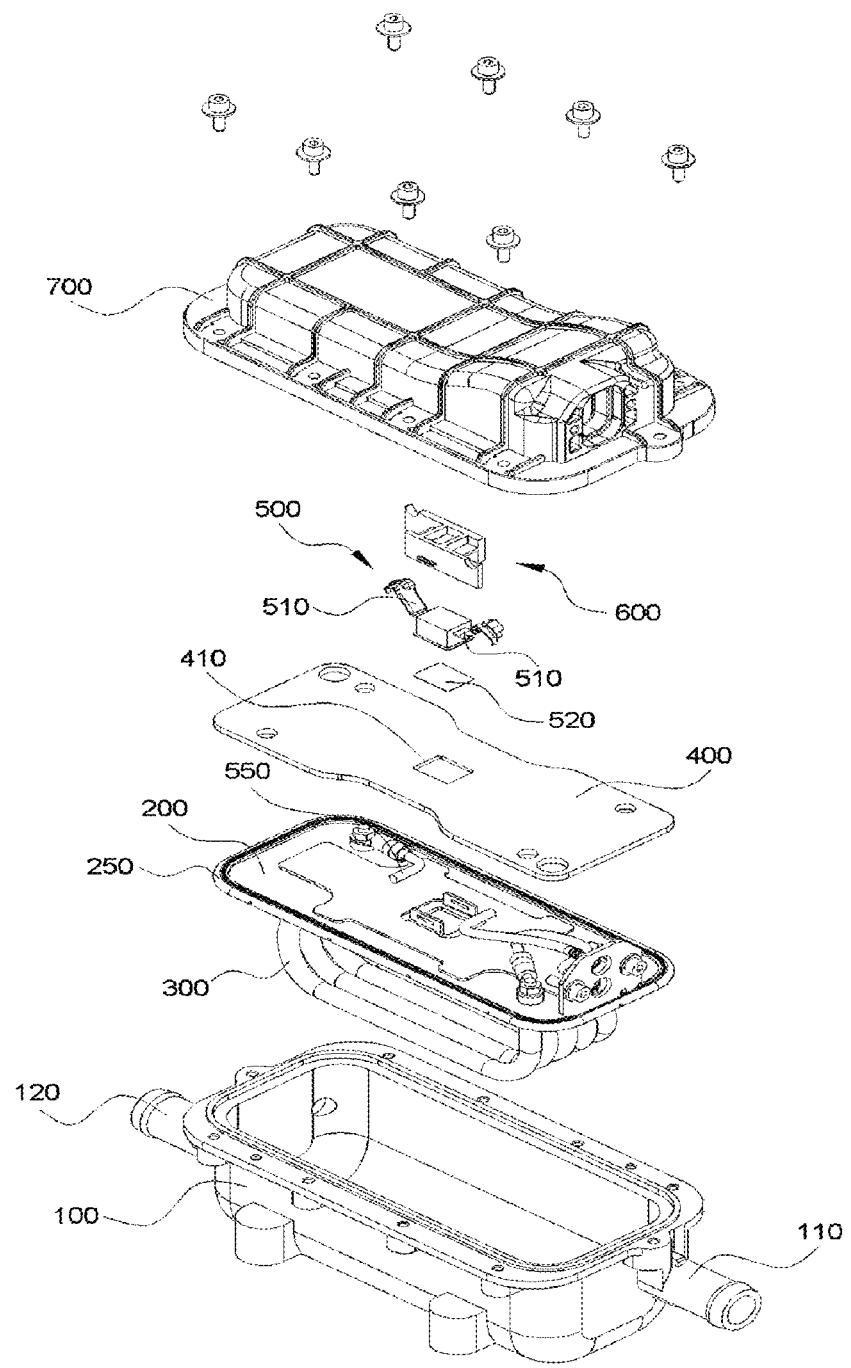
FIG. 5 is an exploded perspective view of the coolant heater according to an embodiment of the present invention.
Figure 6:
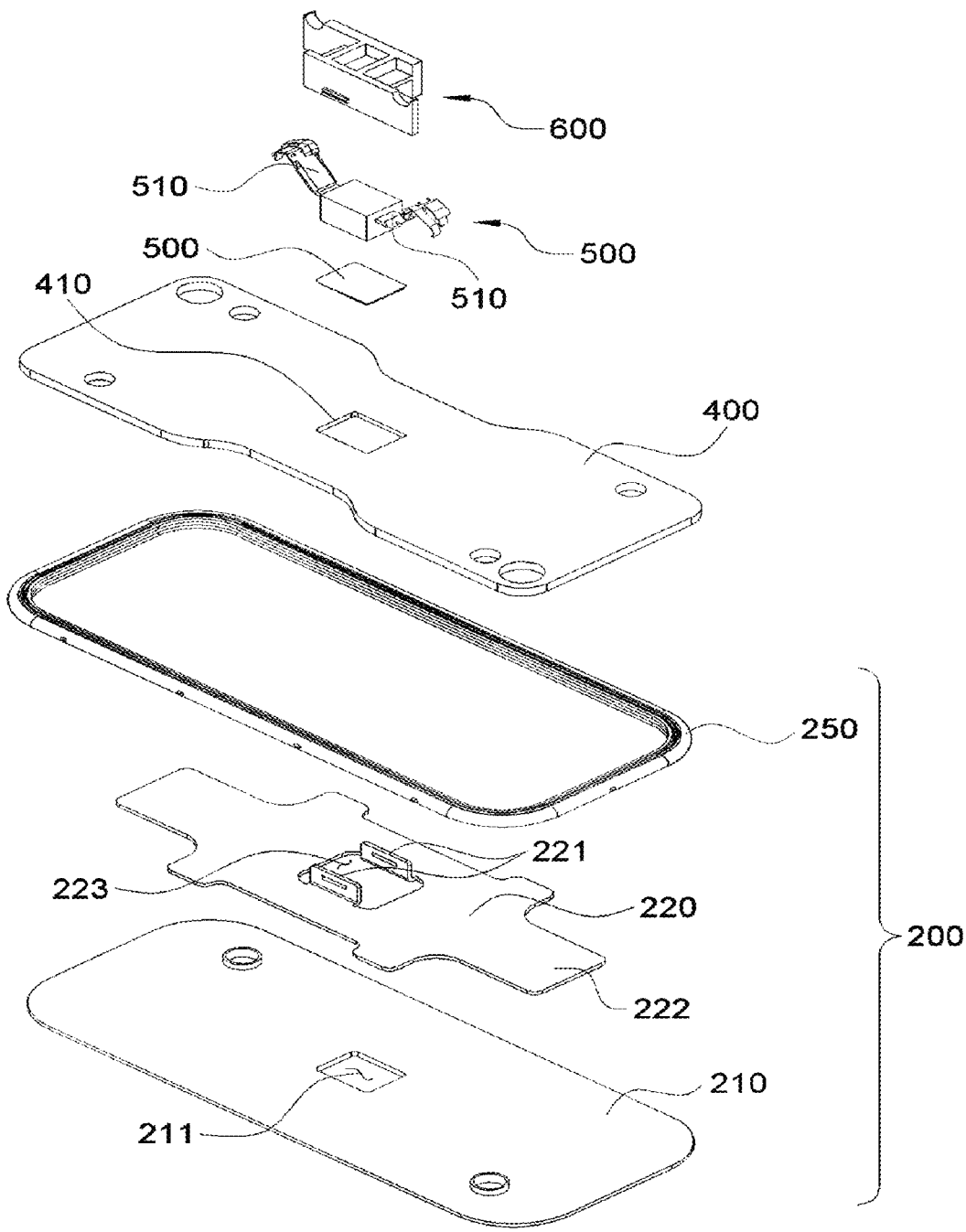
FIG. 6 is a partial exploded perspective view of the coolant heater according to an embodiment of the present invention.

FIG. 3 illustrates an assembled perspective view of a coolant heater according to an embodiment of the present invention, FIG. 4 illustrates a cross-sectional view of the coolant heater according to an embodiment of the present invention, and FIG. 5 illustrates an exploded perspective view of the coolant heater according to an embodiment of the present invention. In addition, FIG. 6 illustrates a partial exploded perspective view of the coolant heater according to an embodiment of the present invention in more detail. As illustrated, a coolant heater 1000 according to an embodiment of the present invention basically includes a heating element 300, a controller 400, a temperature fuse 500, and a fuse cover 600, and may further include a first housing 100, a cover plate 200, and a second housing 700.

The first housing 100 is formed in the shape of a concave container with an opened upper side so as to accommodate coolant therein. The first housing 100 is formed with an inlet portion 110 through which the coolant is introduced and an outlet portion 120 through which the coolant is discharged, so that the coolant may flow through the first housing 100. The first housing 100 may be formed of a metal material, for example, but is not limited thereto, and may be made of various other materials.

The cover plate 200 may be coupled to cover the opened upper side of the first housing 100, and the opened upper side opening of the first housing 100 may be sealed by the cover plate 200. Accordingly, the coolant flows through an inner space formed by the coupling of the first housing 100 and the cover plate 200. The cover plate 200 may be formed of a flat plate of metal material, but is not limited thereto, and may be made of various other materials. A detailed configuration of the cover plate 200 will be described later in more detail.

The heating element 300 is provided in the inner space formed by the coupling of the first housing 100 and the cover plate 200, and serves to heat the coolant flowing into the inner space. The heating element 300 may be various types and forms of heating elements capable of generating heat, and for example, a sheath heater may be used. The sheath heater is an electric heater that may generate heat by electric resistance because an electrothermal wire is built in a protective tube, and is a tube-shaped heater in which the electrothermal wire is built in a metal protective tube in a coil shape, and magnesium oxide, which is an insulating powder, is filled into the protective tube to insulate the electrothermal wire and the protective tube. The sheath heater may be formed in a coil shape made by winding a heater having a long tube shaped length several times, and may be formed in various shapes.

In addition, the heating element 300 may be disposed under the cover plate 200 and provided inside the first housing 100, and both ends of the heating element 300 in a length direction may be coupled and fixed to the cover plate 200. In addition, both ends of the heating element 300 in the length direction may be formed to penetrate the cover plate 200 and protrude upward from an upper surface of the cover plate 200, and both ends of the heating element 300 are formed in a straight line shape upward from both end portions of a coil-shaped wound portion, so that straight line portions may be coupled to the cover plate 200 so as to penetrate through the cover plate 200. At this time, the straight portions through which the heating element 300 penetrates through the cover plate 200 are coupled to the cover plate 200 by welding or the like, so that the coupling portions may be sealed, and a sealing material may be used to seal the portions through which the heating element 300 penetrates the cover plate 200.

The second housing 700 is formed in a concave container shape with an opened lower side, and may be coupled to an upper end portion of the first housing 100. The controller 400, the temperature fuse 500, the fuse cover 600, and the like are provided in an inner space formed by the coupling of the second housing 700 and the cover plate 200, that is, the second housing 700 serves to protect various parts provided in the inner space from the outside. The second housing 700 may be formed of a plastic material, for example, but is not limited thereto, and may be made of various other materials.

Here, a gasket 250 made of an elastic material such as rubber may be fitted and coupled to a circumferential portion of the cover plate 200 to surround the entirety of an edge of the cover plate 200, and in the state in which the gasket 250 is coupled to the cover plate 200, the circumferential portion of the cover plate 200 including the gasket 250 may be interposed between the upper end portion of the first housing 100 and the lower end portion of the second housing 700 to bring the first housing 100 into close contact with the second housing 700. Accordingly, the inner space between the first housing and the cover plate (the space in which the coolant flows) and the inner space between the second housing and the cover plate (the space in which the electronic components are provided) may be sealed by the gasket 250 so as not to be in communication with each other.

The controller 400 is disposed in the first housing 100 and is connected to the heating element 300 to serve to control an operation of the heating element 300. As an example, as illustrated in the cross-sectional view of FIG. 4, the controller 400 may be disposed side by side to be spaced apart from the upper side of the cover plate 200. At this time, the controller 400 may be fixed by being coupled to support portions protruding upward from the cover plate 200 using fastening means or the like. In addition, both ends of the heating element 300 that penetrates through the cover plate 200 and protrudes upward from the cover plate 200 may be coupled to the controller 400 and electrically connected thereto. The controller 400 may be generally implemented in the form of a circuit board or the like, and thus, a position where the controller 400 is provided is not necessarily limited to the position illustrated in FIG. 4. That is, the controller 400 only needs to be electrically connected to the heating element 300 so as to control power supply to the heating element 300, and thus may be provided at any position in the first housing 100.

The temperature fuse 500 is disposed on an upper side of the cover plate 200, and a pair of terminal portions 510 thereof are electrically connected to the controller 400 by cables 550, respectively. The temperature fuse 500 may be formed of a bimetal or the like that may stop an operation of the controller 400 by blocking a current flowing therethrough when a temperature reaches a certain temperature or more. Accordingly, when the heating element 300 or the coolant is overheated, the current is blocked by the temperature fuse 500 to effectively prevent overheating.

The temperature fuse 500 may be made so that a lower surface thereof is in contact with the cover plate 200, particularly as illustrated in the cross-sectional view of FIG. 4. At this time, when the controller 400 is disposed to be spaced apart from the upper side of the cover plate 200, a through hole 410 that vertically penetrates through the controller 400 is formed in a central portion of the controller 400, and the temperature fuse 500 may be disposed in a region where the through hole 410 is formed. The through hole 410 is not necessarily formed in the controller 400, if the controller 400 is provided at a different position regardless of the arrangement of the temperature fuse 500.

At this time, a seating portion 211 may be formed in a portion of the cover plate 200 in contact with the temperature fuse 500 so as to be concave from the upper surface of the cover plate 200 to the lower side thereof. That is, in this case, a portion of a lower side of the temperature fuse 500 is inserted into the seating portion 211 and is seated therein. A lower surface of the seating portion 211 is also preferably made to be in contact with the heating element 300 as illustrated in the cross-sectional view of FIG. 4. By doing so, in addition to preventing the temperature fuse 500 from being departed from a normal position, heat generated from the heating element 300 is quickly transferred to the temperature fuse 500 through the cover plate 200, thereby greatly improving an overheating detection responsiveness. Furthermore, a thermal pad 520 is further interposed between the temperature fuse 500 and the cover plate 200 to further improve the overheating detection responsiveness.

The fuse cover 600 is formed in a shape surrounding the temperature fuse 500 and is coupled to the upper side of the cover plate 200. The fuse cover 600 serves to prevent the temperature fuse 500 from being departed from the normal position and stably support the temperature fuse 500 and the cable 550 connected to the temperature fuse 500. A specific configuration of the fuse cover 600 will be described in more detail below.

[Specific Configuration of Fuse Cover of the Present Invention]

As described above, the temperature fuse 500 is an important part for preventing overheating of the coolant heater 1000, and it is natural that an environment in which the temperature fuse 500 may operate accurately and stably needs to be created. However, the coolant heater 1000 is provided in a vehicle, and is exposed to a fairly random vibration or shock. When the temperature fuse 500 is departed from the normal position, or the temperature fuse 500 itself or the connection between the temperature fuse 500 and the cable 550 is damaged due to the vibration or shock, the temperature fuse 500 may not operate properly.

In order to solve such a problem, the fuse cover 600 is introduced in the present invention. That is, the fuse cover 600 is formed in a form surrounding the temperature fuse 500, thereby making it possible to effectively reduce the occurrence of damage due to the vibration or shock, and in addition, the fuse cover 600 is firmly coupled to the cover plate 200 while accommodating the temperature fuse 500, thereby making it possible to effectively prevent the temperature fuse 500 from departing from the normal position. Hereinafter, a specific shape of the temperature fuse 500 will be described in more detail.

Figure 7:
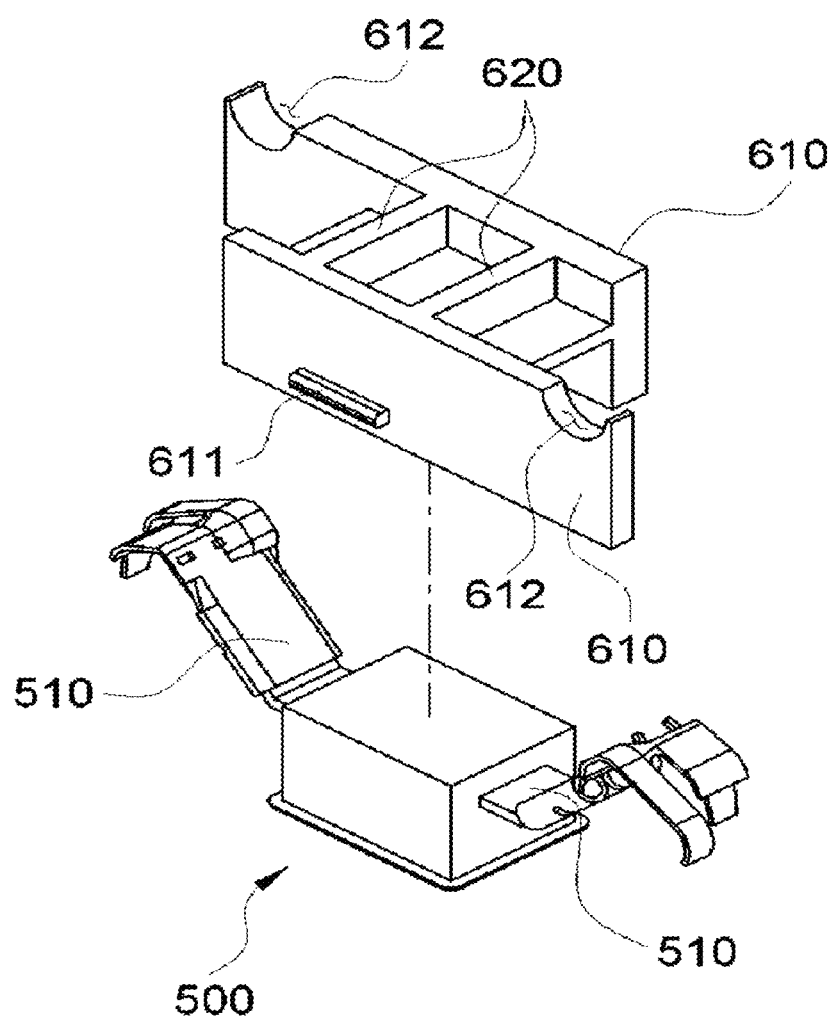
FIG. 7 is an exploded perspective view of a fuse cover and a temperature fuse according to an embodiment of the present invention.

FIG. 7 illustrates an exploded perspective view of a fuse cover and a temperature fuse according to an embodiment of the present invention. As illustrated in FIG. 7, the fuse cover 600 may include a pair of plate surface portions 610 formed in a plate shape vertically disposed on the cover plate 200 and spaced apart from each other and disposed in parallel, and a pair of partition wall portions 620 extending in a separation direction of the plate surface portions 610 to connect the plate surface portions 610. A space in the form of a hexahedron is formed by the pair of plate surface portions 610 and the pair of partition wall portions 620, and the temperature fuse 500 is disposed to be inserted into the space formed by the plate surface portions 610 and the partition wall portions 620, such that the fuse cover 600 may be formed to stably surround the temperature fuse 500. It is preferable that the partition wall portions 620 does not extend over the entirety of the side surface of the temperature fuse 500, but rather is formed to extend over a portion of the upper end of the side surface of the temperature fuse 500 (as schematically illustrated in the cross-sectional view of FIG. 4), so as not to be caught by the terminal portions 510 protruding from the temperature fuse 500.

Since the temperature fuse 500 is an electrical component, it has relatively low stiffness, thus damage may occur even when an excessively strong pressure is applied from the outside. That is, when using a method such as pressing and fixing the temperature fuse 500, a problem in which the temperature fuse 500 is damaged in an assembly process may occur. In another aspect, a method such as bonding the temperature fuse 500 to the cover plate 200 may also be used, and in this case, an adhesive layer is formed between the temperature fuse 500 and the cover plate 200 to increase thermal resistance, thereby deteriorating an overheating detection responsiveness.

Figure 8:
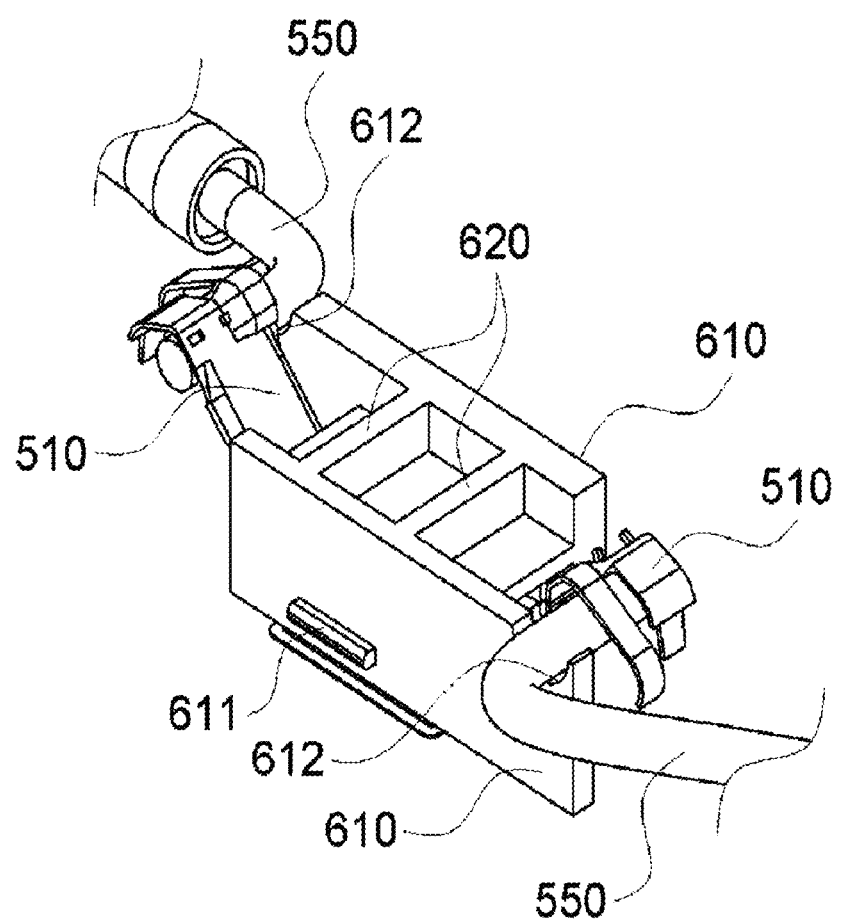
FIG. 8 is an assembled perspective view of the fuse cover and the temperature fuse according to an embodiment of the present invention.

FIG. 8 is an assembled perspective view of the fuse cover and the temperature fuse according to an embodiment of the present invention. As illustrated in FIG. 8, according to the present invention, in a state in which the temperature fuse 500 is primarily protected by being surrounded by the fuse cover 600, the temperature fuse 500 is not directly fixed to the cover plate 200, but the fuse cover 600 (into which the temperature fuse 500 is inserted) is fixed to the cover plate 200. At this time, since the fuse cover 600 acts as a kind of protective member, it may be formed of any shape or material having high stiffness. That is, even if the fuse cover 600 is pressed and fixed, or the fuse cover 600 is coupled to the cover plate 200 in any way, the risk of damaging the fuse cover 600 need not be seriously considered. In addition, since the fuse cover 600 surrounds and protects the temperature fuse 500, even if the shock is applied during the assembly process or the pressure is applied after assembly when the fuse cover 600 is fixedly coupled, the shock or pressure is not directly applied to the temperature fuse 500 itself, and therefore, the risk of damage to the temperature fuse 500 itself may be dramatically reduced. In addition, the fuse cover 600 may be firmly coupled to the cover plate 200 while excluding the risk of damage to the temperature fuse 500 as described above, and accordingly, it is also possible to effectively prevent the problem that the temperature fuse 500 departs from the normal position. That is, by applying the fuse cover 600 as described above, it is possible to fundamentally exclude various problems (problem of damage to parts during the assembly process, and problem of increase in unnecessary thermal resistance due to the coupling structure) described above when the temperature fuse 500 is directly coupled to the cover plate 200.

Furthermore, in the plate surface portions 610 of the fuse cover 600, as illustrated in FIG. 7 and the like, a seating groove 612 may be formed on one side thereof. The cable 550 is inserted and seated into the seating groove 612 as illustrated in FIG. 8 and the like. Conventionally, since there was no structure to stably support the cable 550, the cable 550 was substantially supported by the coupling of the cable 550 and the terminal portion 510. Therefore, when external vibration, shock, and the like occur, the cable 550 is greatly shaken, and a fatigue shock occurs in the coupling portion or further, the terminal portion 510 or the cable 550 itself, which has a problem that causes a short circuit. However, according to the present invention, the seating groove 612 is formed on the plate surface portion 610 of the fuse cover 600, and the cable 550 is stably inserted and seated into the seating groove 612. Accordingly, even if the external vibration or the shock occurs, the cable 550 is not shaken, and thus the damage or the short circuit caused by the fatigue shock may be effectively prevented.

Figure 9:
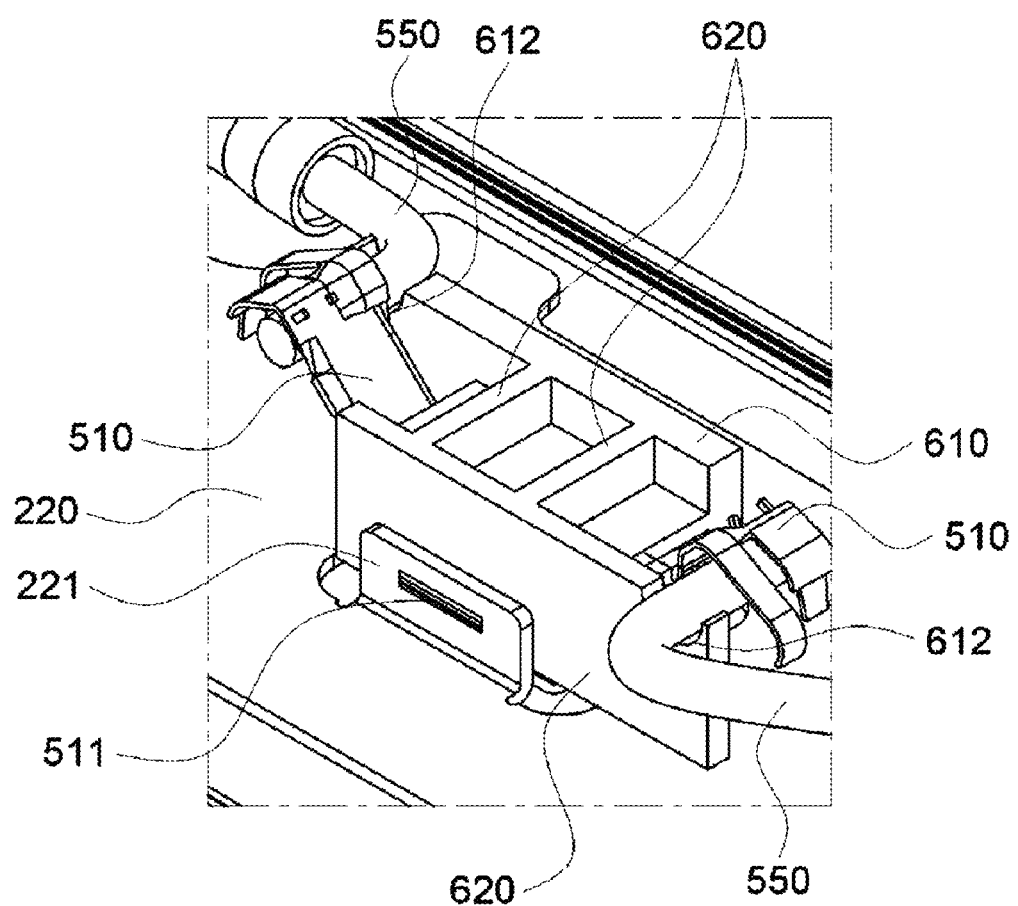
FIG. 9 is an assembled perspective view of the fuse cover, the temperature fuse, and a cover plate according to an embodiment of the present invention.
Figure 10:
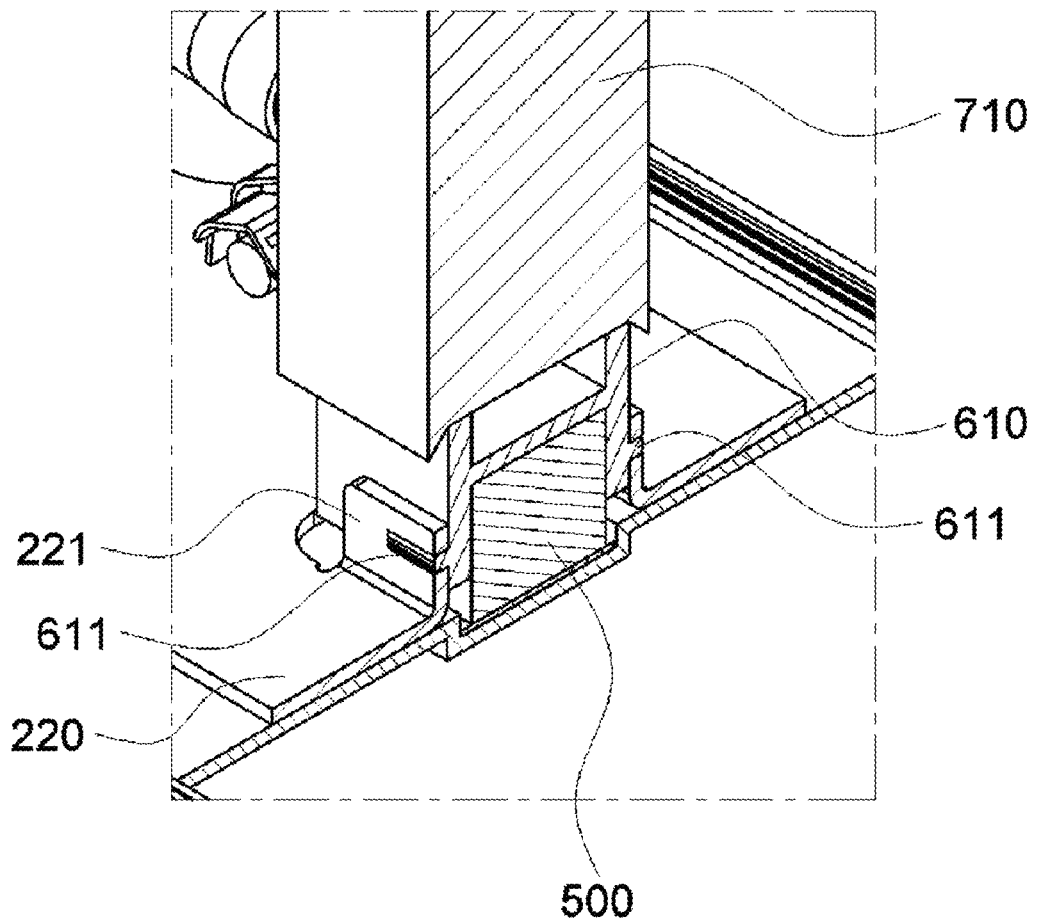
FIG. 10 is a cross-sectional view of the fuse cover, the temperature fuse, and the cover plate according to an embodiment of the present invention.

FIGS. 9 and 10 illustrate an assembled perspective view and a cross-sectional view of the fuse cover, the temperature fuse, and the cover plate according to an embodiment of the present invention, respectively. FIG. 9 is an example of a configuration in which the fuse cover 600 is coupled and fixed to the cover plate 200, and in this case, protrusions 611 are formed on the plate surface portions 610, a pair of catching portions 221 formed in a plate shape parallel to the plate surface portions 610 on the upper side of the cover plate 200 and having a through hole is formed to protrude, such that the coupling between the fuse cover 600 and the cover plate 200 may be performed in a hooking method in which the protrusions 611 are fitted to the catching portions 221. FIG. 9 is a view seen from the front of a state in which the protrusion 611 is fitted and fixed to the catching portion 221, and FIG. 10 illustrates a cross-section of the state in which the protrusion 611 is fitted and fixed to the catching portion 221. As may be easily inferred from FIGS. 9 and 10, the coupling between the fuse cover 600 and the cover plate 200 is made in the following processes. After disposing the temperature cover 500 at the normal position, if the fuse cover 600 is lowered as if the temperature cover 500 is covered from the upper side, the plate surface portion 610 is slidingly lowered in surface contact with the catching portion 221. When the fuse cover 600 is further lowered, the protrusion 611 protruding on the plate surface portion 610 meets the catching portion 221, and as a result, the catching portion 221 is opened while being pushed by the protrusion 611. When the fuse cover 600 is further lowered, the protrusion 611 reaches a position of the through hole on the catching portion 221, and as a result, the protrusion 611 comes out through the through hole and the catching portion 221 is returned to an original shape thereof, so that the protrusion 611 is caught in the catching portion 221 and may be firmly fixed in the form as illustrated in FIGS. 9 and 10.

As such, the fuse cover 600 may be fixedly coupled to the cover plate 200 by the hooking coupling between the protrusion 611 and the catching portion 221. At this time, in order to not only fix the fuse cover 600 more firmly in the assembled state, but also to ensure that the process in which the fuse cover 600 is coupled to the cover plate 200 in the assembly process may be made more smoothly, it is preferable that a support portion 710 protruding downward is formed on a lower surface of a position corresponding to the fuse cover 600 of the second housing 700. As illustrated in the cross-sectional views of FIGS. 4 and 10, the support portion 710 is formed in a form of pressing and supporting the upper surface of the fuse cover 600, and therefore, the fuse cover 600 and the cover plate 200 may be more firmly coupled. In addition, in the case in which the support portion 710 is formed, when the assembly process of coupling the second housing 700 with the first housing 100 is performed after placing the fuse cover 600 on the temperature fuse 500, the support portion 710 presses the upper surface of the fuse cover 600 as the second housing 700 and the support portion 710 connected thereto descend, such that the hooking coupling between the protrusion 611 and the catching portion 221 may be made smoothly as the fuse cover 600 also descends naturally. It is preferable that the support portion 710 is provided with a guide portion 720 extending from a lower end to a lower side, such that a portion of the upper side of the fuse cover 600 is inserted into the inside surrounded by the guide portion 720, and by doing so, in a such an assembly process, the fuse cover 600 may be prevented from being slid and departed from the normal position.

[Specific Configuration of Cover Plate of the Present Invention]

As described above, according to the present invention, the position of the temperature fuse 500 is fixed by inserting the temperature fuse 500 into the fuse cover 600 and coupling the fuse cover 600 to the cover plate 200, not directly fixing the temperature fuse 500 to the cover plate 200. At this time, as illustrated in FIG. 9 and the like, the hooking coupling with the protrusions 611 formed on the fuse cover 600 may be performed by using the catching portions 221 protruding upward from the cover plate 200.

At this time, the configuration of forming the catching portions 221 on the cover plate 200 may be made in various ways. Most simply, a small part in the shape of the catching portion 221 may be manufactured and the small part may be formed on the cover plate 200 by a welding or bolt coupling. However, in the case in which such a small part is welded, since a welding area is small and a coupling force is weak, a problem such as a drop in a welding site due to pressure, external vibration, or shock received during assembly may occur. In addition, in the case of using the bolt coupling, since the cover plate 200 is a part that divides the space in which the coolant is accommodated and the space in which the electronic components are accommodated, it is highly undesirable to form a bolt hole in the cover plate 200 with a risk of leaking. According to the present invention, there is disclosed a structure of the cover plate 200 that may overcome all of the above-described problems and obtain a new effect.

Figure 11:
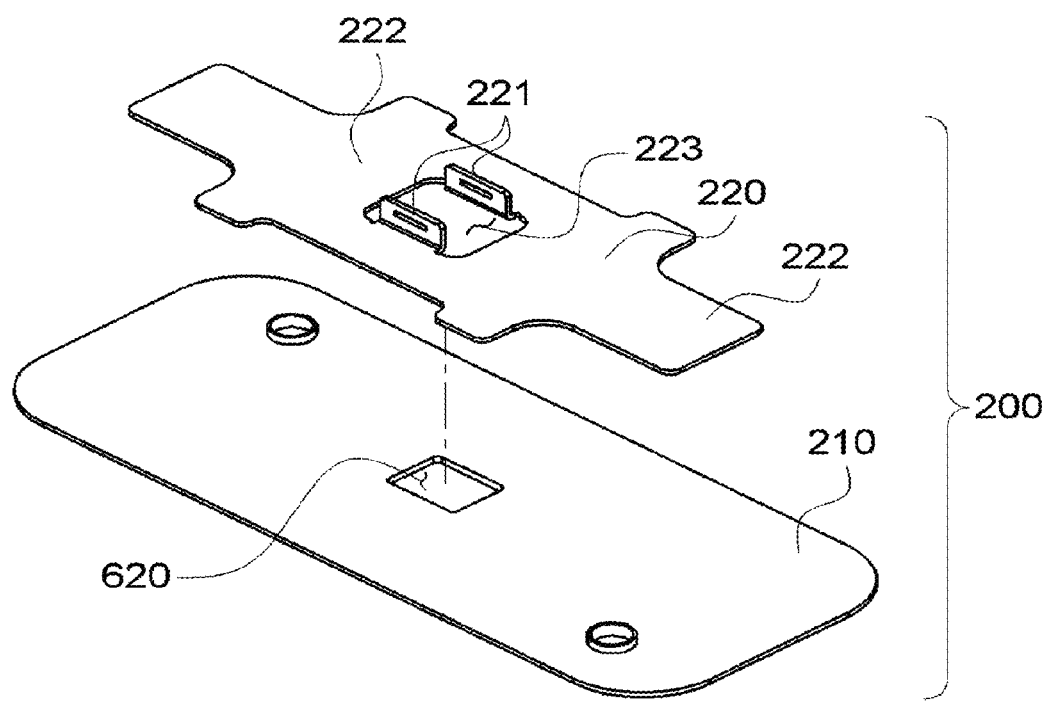
FIGS. 11A and 11B are exploded and assembled perspective views of the cover plate according to an embodiment of the present invention.
Figure 11:
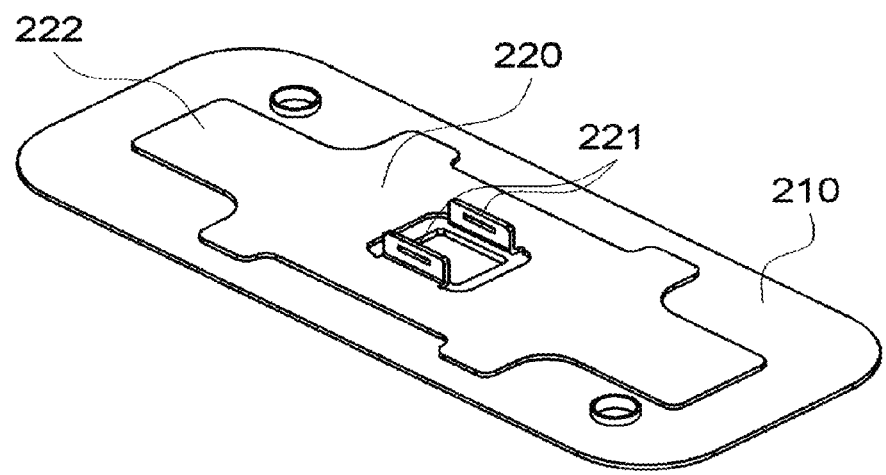

FIGS. 11A and 11B illustrate exploded and assembled perspective views of the cover plate according to an embodiment of the present invention. As illustrated in FIGS. 11A and 11B, the cover plate 200 according to the present invention may include a main plate 210 formed in a shape corresponding to the opened upper surface of the first housing 100 and a sub-plate 220 coupled to be in surface contact with an upper surface of the main plate 210 and coupled with the fuse cover 600.

The main plate 210 is coupled to the upper surface of the first housing 100 to seal the first housing 100, thereby preventing the coolant from leaking into the space in which the electronic components are accommodated. The sub-plate 220 may be particularly disposed on a region corresponding to the position where the heating element 300 is disposed, and may be formed so that the main plate 210 and the sub-plate 220 are brazed. By doing so, a stiffness of a portion where the main plate 210 and the sub-plate 220 are coupled may be enhanced, thereby reducing various risks of damage due to heat generation of the heating element 300. Furthermore, it is preferable that the sub-plate 220 includes an extension bar 222 extending to protrude in the length direction of the coolant heater 1000, so as to increase a brazing coupling force with the main plate 210.

As described above, since the main plate 210 serves to cover the upper surface of the first housing 100 and seal the first housing 100, it is not preferable that holes or the like are formed therein except inevitable cases. However, the sub-plate 220 is a part that is brazed to the main plate 210 and is not related to the sealing of the first housing 100, and therefore, various shapes, such as a hole or a bending, may be formed on the sub-plate 220. In view of such an aspect, in one embodiment of the present invention, a portion of the central portion of the sub-plate 220 is cut out and bent to form the catching portions 221, as illustrated in FIGS. 11A and 11B. The catching portions 221 are parts of the sub-plate 220, when the sub-plate 220 is brazed to the main plate 210, the sub-plate 220 may be formed much more firmly and stably (because the welding area is very large) compared to the case of fixing a small separate part as described above.

Meanwhile, as described above, the seating portion 211 is a space formed to be concave from the upper surface of the cover plate 200 to the lower side thereof, and the temperature fuse 500 is seated in the seating portion 211 to prevent the temperature fuse 500 from departing from the normal position. However, at this time, a seating hole 223 is inevitably formed in the portion cut out to form the catching portions 221, and when the main plate 210 and the sub-plate 220 are coupled, a step equal to a thickness of the sub-plate 220 occurs in the seating hole 223 and such a step space may act as the seating portion 211 (described above) as it is. Alternatively, when the seating groove 211 is formed to be concave downward on the main plate 210 and the seating hole 223 is disposed to be formed at a position corresponding to the seating portion 211, a step equal to the sum of a depth of the seating portion 211 and the thickness of the sub-plate 220 occurs, and in this case, since the temperature fuse 500 is seated in a deeper step space, more stable seating may be realized.

The present invention is not limited to the above-described embodiments, and may be variously applied. In addition, the present invention may be variously modified by those skilled in the art to which the present invention pertains without departing from the spirit of the present invention claimed in the claims.

INDUSTRIAL APPLICABILITY

According to the present invention, in the coolant heater that may effectively heat the coolant of the vehicle, the overheating detection responsiveness is improved, the stability is secured, the durability at the coupling portion of the temperature fuse, the stiffness of the plate, the operability of the temperature fuse itself, and the durability against the external shock are improved.

What is claimed:
1. A coolant heater comprising:
    a heating element for heating coolant;
    a controller for controlling the heating element;
    a temperature fuse having a pair of terminal parts electrically connected to the controller by a cable and blocking current supply of the heating element according to a temperature of the coolant;
a fuse cover formed in a form surrounding the temperature fuse and mounted with the cable;
    a first housing formed in a shape of a concave container with an opened upper side, and having an inlet portion through which the coolant is introduced and an outlet portion through which the coolant is discharged;
    a cover plate coupled to cover the opened upper side of the first housing; and
    a second housing formed in a shape of a concave container with an opened lower side and coupled to an upper end portion of the first housing,
    wherein the heating element is provided in an inner space formed by a coupling of the first housing and the cover plate,
    the controller is disposed in the first housing,
    the temperature fuse is disposed on an upper side of the cover plate and has a lower surface in contact with the cover plate, and
    the fuse cover is coupled to the upper side of the cover plate.
2. The coolant heater of claim 1, wherein the fuse cover includes a pair of plate surface portions formed in a plate shape vertically disposed on the cover plate and spaced apart from each other and disposed in parallel, and a pair of partition wall portions extending in a separation direction of the plate surface portions to connect the plate surface portions, and
    the temperature fuse is disposed to be inserted into a space formed by the plate surface portions and the partition wall portions.
3. The coolant heater of claim 2, wherein protrusions are formed on the plate surface portions,
    a pair of catching portions formed in a plate shape parallel to the plate surface portions on the upper side of the cover plate and having a through hole is formed to protrude, and
    the coupling between the fuse cover and the cover plate is performed in a hooking method in which the protrusions are fitted to the catching portions.
4. The coolant heater of claim 2, wherein a seating groove is formed in one side of the plate surface portions of the fuse cover, and
    the cable is inserted and seated into the seating groove.
5. The coolant heater of claim 1, wherein a support portion is formed to protrude downward from a lower surface of a position corresponding to the fuse cover of the second housing, and
    an upper surface of the fuse cover is supported by being in contact with the support portion.
6. The coolant heater of claim 5, wherein the support portion is provided with a guide portion extending from a lower end to a lower side, and
    a portion of the upper side of the fuse cover is inserted into the inside surrounded by the guide portion.

7. The coolant heater of claim 1, wherein a seating portion is formed to be concave from the upper surface of the cover plate to the lower side thereof, and
   a portion of a lower side of the temperature fuse is inserted into the seating portion.

8. The coolant heater of claim 1, wherein the cover plate includes a main plate formed in a shape corresponding to the opened upper surface of the first housing and a sub-plate coupled to be in surface contact with an upper surface of the main plate and coupled with the fuse cover.

9. The coolant heater of claim 8, wherein the sub-plate is disposed on a region corresponding to the position where the heating element is disposed.

10. The coolant heater of claim 8, wherein the cover plate is formed so that the main plate and the sub-plate are brazed.

11. The coolant heater of claim 10, wherein the sub-plate includes an extension bar extending to protrude in a length direction of the coolant heater.

12. The coolant heater of claim 1, further comprising a thermal pad interposed between the temperature fuse and the cover plate.

13. The coolant heater of claim 1, further comprising a gasket disposed for sealing at one end of the cover plate in contact with the first housing and the second housing.

14. The coolant heater of claim 1, wherein the controller is disposed to be spaced apart from the upper side of the cover plate and a through hole that vertically penetrates through the controller is formed in a central portion of the controller, and
   the temperature fuse is disposed in a region where the through hole is formed.

15. A coolant heater comprising:
a heating element for heating coolant;
a temperature fuse for blocking current supply of the heating element according to a temperature of the coolant; and
a fuse cover formed in a form surrounding the temperature fuse and mounted with the cable;
a first housing formed in a shape of a concave container with an opened upper side, and having an inlet portion through which the coolant is introduced and an outlet portion through which the coolant is discharged;
a cover plate coupled to cover the opened upper side of the first housing; and
a second housing formed in a shape of a concave container with an opened lower side and coupled to an upper end portion of the first housing,
wherein the heating element is provided in an inner space formed by a coupling of the first housing and the cover plate,
the temperature fuse is disposed on an upper side of the cover plate and has a lower surface in contact with the cover plate, and
the fuse cover is coupled to the upper side of the cover plate.

16. The coolant heater of claim 15, further comprising, a controller for controlling the heating element, wherein the temperature fuse is electrically connected to the controller.

17. The coolant heater of claim 16 wherein the controller is disposed in the first housing.

* * * * *